(12) United States Patent
Khoury et al.

(10) Patent No.: US 12,342,261 B2
(45) Date of Patent: Jun. 24, 2025

(54) AUTOMATED ESTABLISHING OF A HIDDEN TRANSMITTED BASIC SERVICE SET

(71) Applicant: Ruckus IP Holdings LLC, Claremont, NC (US)

(72) Inventors: Peter G. Khoury, San Francisco, CA (US); Kaushik Guha, Fremont, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 372 days.

(21) Appl. No.: 17/890,318

(22) Filed: Aug. 18, 2022

(65) Prior Publication Data

US 2023/0067513 A1    Mar. 2, 2023

Related U.S. Application Data

(60) Provisional application No. 63/237,319, filed on Aug. 26, 2021.

(51) Int. Cl.
| | |
|---|---|
| *H04W 48/08* | (2009.01) |
| *H04W 76/10* | (2018.01) |
| *H04W 84/12* | (2009.01) |

(52) U.S. Cl.
CPC ........... *H04W 48/08* (2013.01); *H04W 76/10* (2018.02); *H04W 84/12* (2013.01)

(58) Field of Classification Search
CPC ............................... H04W 84/12; Y02D 30/70
See application file for complete search history.

(56) References Cited

U.S. PATENT DOCUMENTS

| | | | |
|---|---|---|---|
| 2015/0230161 A1 | 8/2015 | Park et al. | |
| 2017/0289274 A1 | 10/2017 | Levy et al. | |
| 2018/0098378 A1* | 4/2018 | Patil | H04W 48/12 |
| 2020/0213936 A1 | 7/2020 | Fan | |
| 2020/0221378 A1* | 7/2020 | Kneckt | H04W 48/14 |
| 2021/0392571 A1* | 12/2021 | Kneckt | H04W 48/10 |

OTHER PUBLICATIONS

"International Search Report and Written Opinion of the International Patent Application No. PCTUS2275303, mailed Nov. 21, 2022, 11 pages".

* cited by examiner

*Primary Examiner* — Fabricio R Murillo Garcia
(74) *Attorney, Agent, or Firm* — Steven Stupp

(57) ABSTRACT

An electronic device (such as an access point) is described. During operation, the electronic device may create a hidden transmitted BSS. For example, the hidden transmitted BSS may be hidden, e.g., from an operator of a network that includes the electronic device and/or from one or more second electronic devices. Moreover, the electronic device may transmit a multi-BSS beacon with a transmitted BSSID and a wild-card SSID (or blank character string) of the hidden transmitted BSS, and, for one or more non-transmitted BSSes, one or more non-transmitted BSSIDs and their associated SSIDs. Then, the electronic device may establish one or more connections with the one or more second electronic devices via the one or more non-transmitted BSSes. Furthermore, the electronic device may deactivate a given non-transmitted BSS in the one or more non-transmitted BSSes without impacting a remainder of the non-transmitted BSSes.

20 Claims, 6 Drawing Sheets

AUTOMATED ESTABLISHING OF A HIDDEN TRANSMITTED BASIC SERVICE SET

CROSS REFERENCE TO RELATED APPLICATIONS

This application claims priority under 35 U.S.C. 119(e) to U.S. Provisional Application Ser. No. 63/237,319, "Automated Establishing of a Hidden Transmitted Basic Service Set," filed on Aug. 26, 2021, by Peter G. Khoury, the contents of which are herein incorporated by reference.

FIELD

The described embodiments relate to techniques for an access point to robustly support multiple wireless local area networks (WLANs) by automatically establishing a hidden transmitted basic service set (BSS).

BACKGROUND

Many electronic devices are capable of wirelessly communicating with other electronic devices. For example, these electronic devices can include a networking subsystem that implements a network interface for: a cellular network (UNITS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Washington), and/or another type of wireless network.

Recently, new wireless standards, such as IEEE 802.11ax (which is sometimes referred to as 'Wi-Fi 6'), offer additional capabilities to compatible electronic devices relative to previous IEEE 802.11 standards. For example, a multi-basic-service set (BSS) may aggregate beacons or probe responses by creating one transmitted BSS that forms a base set with the information (IEs) needed to connect to a BSS. Other BSSes (which are sometimes referred to as other WLANs or virtual access points or VAPs) are so-called non-transmitted BSSes, and the aggregated beacon and probe response may include a delta or difference set of information for these non-transmitted BSSes. Thus, a compatible access point may transmit a multi-BSS beacon with a transmitted basic service set identifier (BSSID) and service set identifier (SSID) of the transmitted BSS and one or more non-transmitted BSSIDs and one or more associated SSIDs of the non-transmitted BSSes. However, in existing wireless standards, when the transmitted BSS is turned off, all of the clients on this transmitted. BSS (including the one or more non-transmitted BSSes) may be disconnected.

Moreover, in order to facilitate client compatibility, it is typically desirable for the transmitted BSS include the smallest set of IEs. However, it is often difficult, to dynamically configure this set of IEs at runtime. While, in principle, a given non-transmitted BSS can address this problem by explicitly excluding unwanted or unnecessary IEs from the transmitted BSS in IEs associated with the given non-transmitted BSS, in practice this capability is often not supported. Consequently, the non-transmitted BSSes often inherit IEs from the transmitted BSS that are not needed or desired.

SUMMARY

An electronic device (such as an access point) is described. This electronic device includes an interface circuit that wirelessly communicates with one or more second electronic devices. During operation, the electronic device creates a hidden transmitted BSS. For example, the hidden transmitted BSS may be hidden, e.g., from an operator of a network that includes the electronic device and/or from the one or more second electronic devices. Moreover, the electronic device transmits a multi-BSS beacon with a transmitted BSSID and a wild-card SSID (or blank character string) of the hidden transmitted BSS, and, for one or more non-transmitted BSSes, one or more non-transmitted BSSIDs and their associated SSIDs. Then, the electronic device establishes one or more connections with the one or more second electronic devices via the one or more non-transmitted BSSes. Furthermore, the electronic device deactivates a given non-transmitted BSS in the one or more non-transmitted BSSes without impacting a remainder of the non-transmitted BSSes.

Note that the electronic device may be compatible with IEEE 802.11ax.

Moreover, the hidden transmitted BSS may not occur in scan lists of the one or more second electronic devices.

Furthermore, the hidden transmitted BSS may not be used by the electronic device to establish connections or to communicate with the one or more second electronic devices.

Additionally, the hidden transmitted BSS may not have a non-blank character string as an SSID of the hidden transmitted BSS.

In some embodiments, the electronic device may not deactivate the hidden transmitted. BSS.

Note that the electronic device may automatically create the hidden transmitted BSS. Alternatively, the electronic device may create the hidden transmitted BSS in response to user-interface activity associated with a user of the electronic device, which specifies that an SSID of the hidden transmitted BSS is the wild-card SSID.

Moreover, IEs associated with the hidden transmitted BSS may be common to the hidden transmitted BSS and the one or more non-transmitted BSSes. For example, the IEs may include a minimum number of Ws that are common to the hidden transmitted. BSS and the one or more non-transmitted BSSes.

Another embodiment provides a computer-readable storage medium for use with the electronic device. This computer-readable storage medium may include program instructions that, when executed by the electronic device, cause the electronic device to perform at least some of the aforementioned operations.

Another embodiment provides a method. This method includes at least some of the operations performed by the electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device (such as an access point) is described. During operation, the electronic device may create a hidden transmitted BSS. For example, the hidden transmitted BSS may be hidden, e.g., from an operator of a network that includes the electronic device and/or from one or more second electronic devices. Moreover, the electronic device may transmit a multi-BSS beacon with a transmitted BSSID and a wild-card SSID (or blank character string) of the hidden transmitted BSS, and, for one or more non-transmitted BSSes, one or more non-transmitted BSSIDs and their associated SSIDs. Then, the electronic device may establish one or more connections with the one or more second electronic devices via the one or more non-transmitted BSSes. Furthermore, the electronic device may deactivate a given non-transmitted BSS in the one or more non-transmitted BSSes without impacting a remainder of the non-transmitted BSSes.

By creating the hidden transmitted BSS, these communication techniques may allow the electronic device to activate and deactivate any of the one or more non-transmitted BSSes without impact to each other (or independently). Moreover, the hidden transmitted BSS may have a minimum number of IEs that are common to the hidden transmitted BSS and the one or more non-transmitted BSSes, so that the one or more non-transmitted BSSes do not inherent any unwanted or unnecessary IEs. These capabilities may simplify the dynamic configuration and use of multiple BSSes in a network. Consequently, the communication techniques may improve the ease of use and the communication performance of the network, which may provide an improved user experience.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth, and/or another type of wireless interface (such as another wireless-local-area-network interface). Moreover, an access point in the system may communicate with a controller or services using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

Figure 1:
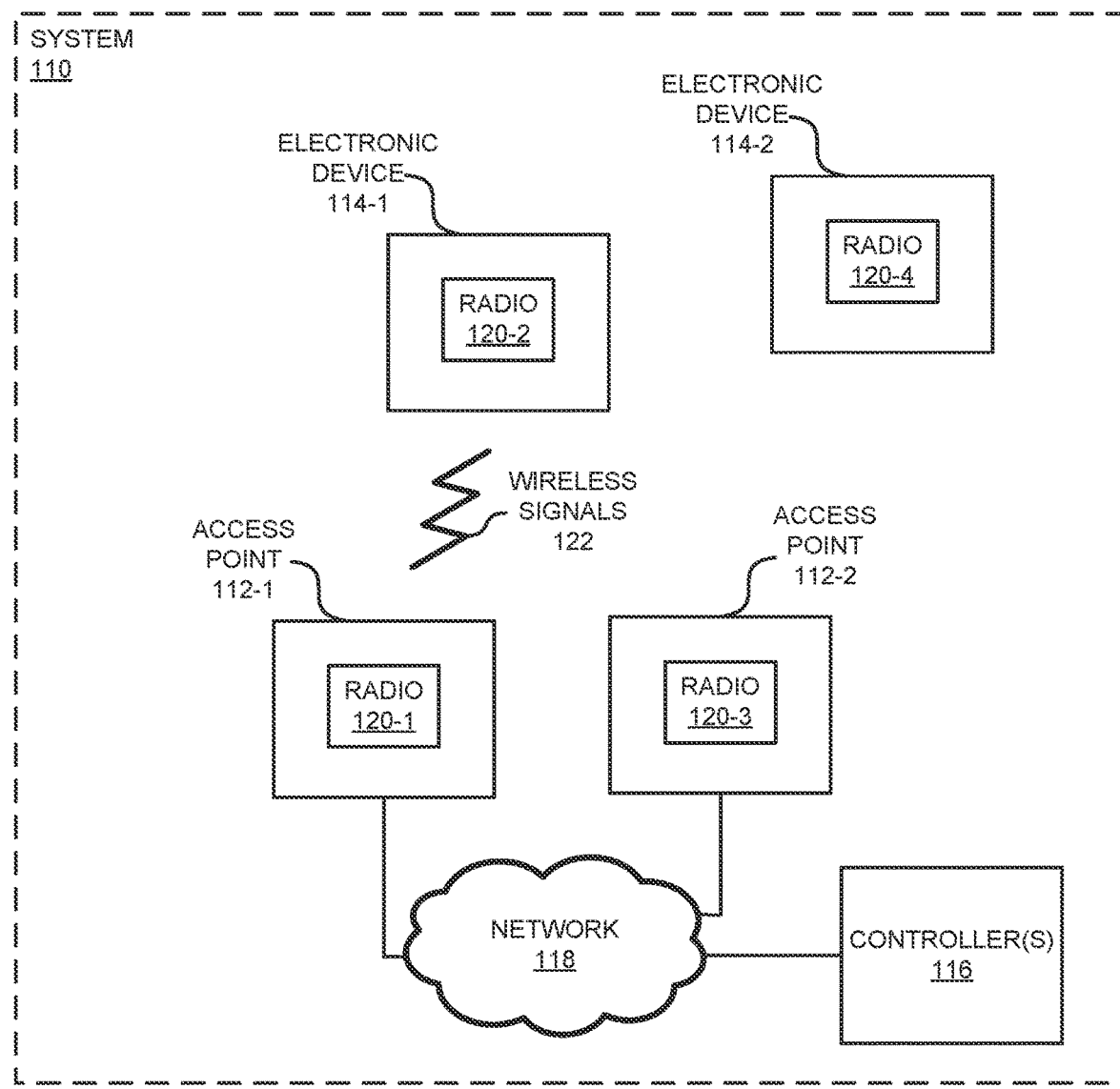
FIG. 1 is a block diagram illustrating an example of a system in accordance with an embodiment of the present disclosure.

We now describe some embodiments of the communication techniques. FIG. 1 presents a block diagram illustrating an example of a system 110, which may include components, such as: one or more access points 112, one or more electronic devices 114 (such as cellular telephones, stations or clients, another type of electronic device, etc.), and one or more optional controllers 116. In system 110, one or more of the one or more access points 112 may wirelessly communicate with one or more of the one or more electronic devices 114 using wireless communication that is compatible with an IEEE 802.11 standard. Thus, the wireless communication may occur in, e.g., a 2.4 GHz, a 5 GHz and/or a 60 GHz frequency band. (Note that IEEE 802.11ad communication over a 60 GHz frequency band is sometimes referred to as 'WiGig.' In the present discussion, these embodiments are also encompassed by 'Wi-Fi.') However, a wide variety of frequency bands may be used. Moreover, the one or more access points 112 may communicate with the one or more optional controllers 116 via network 118 (such as the Internet, an intra-net and/or one or more dedicated links). Note that the one or more optional controllers 116 may be at the same location as the other components in system 110 or may be located remotely (i.e., at a different location). Moreover, note that the one or more access points 112 may be managed and/or configured by the one or more optional controllers 116. Furthermore, note that the one or more access points 112 may provide access to network 118 (e.g., via an Ethernet protocol), and may be a physical access point or a virtual or 'software' access point that is implemented on a computer or an electronic device. While not shown in FIG. 1, there may be additional components or electronic devices, such as a router.

Additionally, as noted previously, the one or more access points 112 and the one or more electronic devices 114 may communicate via wireless communication. Notably, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

Figure 6:
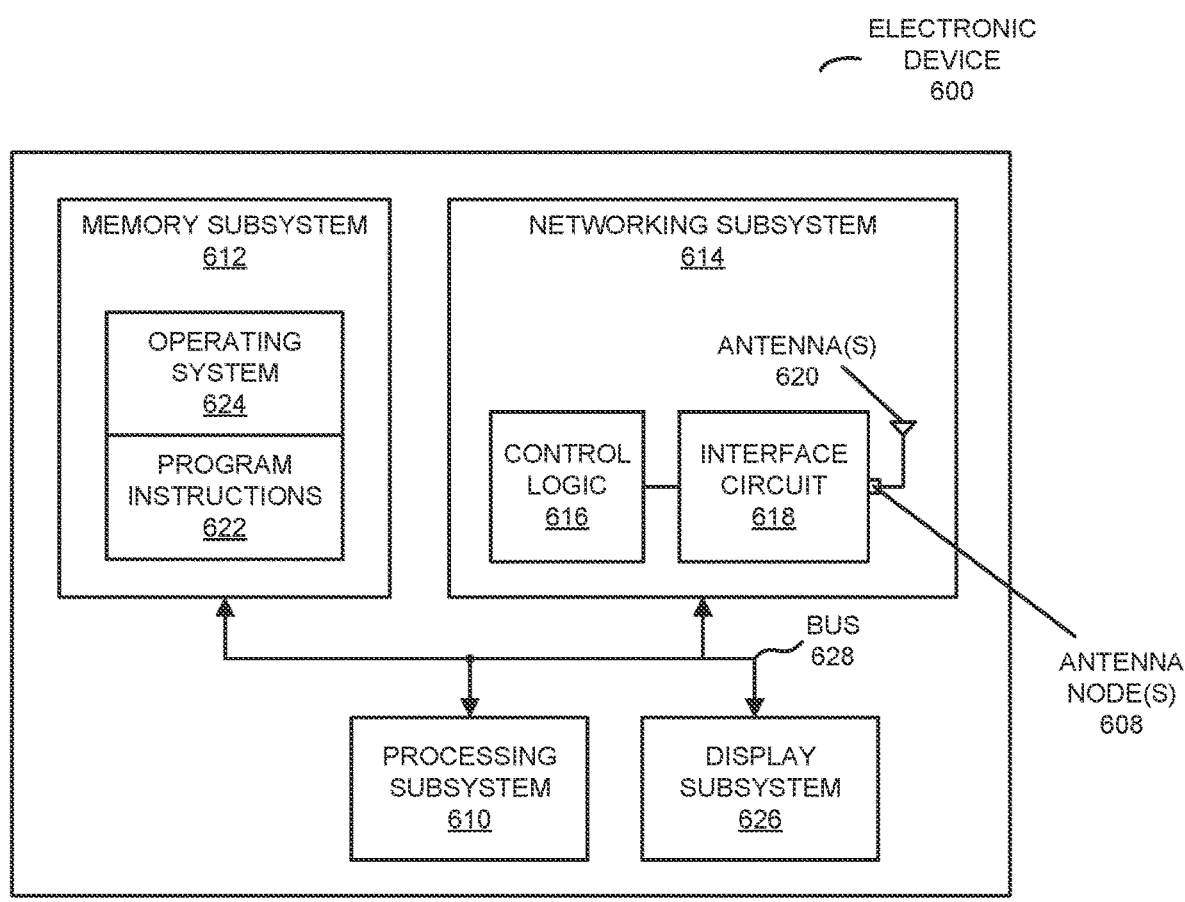
FIG. 6 is a block diagram illustrating an example of an electronic device in accordance with an embodiment of the present disclosure.

As described further below with reference to FIG. 6, the one or more access points 112, the one or more electronic devices 114 and/or the one or more optional controllers 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-2 in electronic device 114-1. These wireless signals are received by radio 120-1 in at least one of the one or more access points 112, such as access point 112-1. Notably, electronic device 114-1 may transmit frames or packets. In turn, these frames or packets may be received by access point 112-1. This may allow electronic device 114-1 to communicate information to access point 112-1. Note that the communication between electronic device 114-1 and access point 112-1 may be characterized by a variety of performance metrics, such as: a data rate, a data rate for successful communication (which is sometimes referred to as a 'throughput'), an error rate (such as a retry or reseed rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 120 are shown in the one or more electronic devices 114 and the one or more access points 112, one or more of these instances may be different from the other instances of radios 120.

As noted previously, access points 114 may support multiple BSSes. However, it is often difficult to independently activate and deactive BSSes and/or it can be difficult to dynamically configure BSSes at runtime.

In order to address these challenges, at least one of access points 112 (such as an access point that supports a new IEEE 802.11 standard, e.g., access point 112-1) may implement or use the communication techniques according to embodiments of the present disclosure. Notably, as discussed further below with reference to FIGS. 2-5, during the communication techniques access point 112-1 may create a hidden transmitted BSS. For example, the hidden transmitted BSS may be hidden, e.g., from an operator of a network that includes access point 112-1 and/or from one or more electronic devices 114-1. Moreover, access point 112-1 may transmit a multi-BSS beacon with a transmitted BSSID and a wild-card SSM (or blank character string) of the hidden transmitted BSS, and, for one or more non-transmitted BSSes, one or more non-transmitted BSSIDs and their associated SSIDs.

Then, access point 112-1 may establish one or more connections with the one or more electronic devices 114 via the one or more non-transmitted BSSes. For example, in response to the multi-BSS beacon, a given one of the one or more electronic devices 114 may associate with access point 112-1 using a given non-transmitted BSS.

Furthermore, access point 112-1 may deactivate the given non-transmitted. BSS in the one or more non-transmitted BSSes without impacting a remainder of the non-transmitted BSSes.

Note that IEs associated with the hidden transmitted BSS may be common to the hidden transmitted BSS and the one or more non-transmitted BSSes. For example, the IEs may include a minimum number of IEs that are common to the hidden transmitted BSS and the one or more non-transmitted BSSes.

In these ways, access points that use the communication techniques may flexibly support multiple BSSes. For example, a given non-transmitted BSS may be deactivated or turned off without deactivating (and then requiring subsequent reactivation) of another non-transmitted BSS. Moreover, the given non-transmitted BSS may not inherent unwanted or unnecessary IEs from the hidden transmitted BSS. Consequently, the communication techniques may improve communication performance and ease of use (or may reduce user frustration) when using access point 112-1, electronic device 114-1 and the associated BSSes or WLANs and, thus, may provide an improved user experience.

In the described embodiments, processing a frame or a packet in a given one of the one or more access points 112 or a given one of the one or more electronic devices 114 may include: receiving wireless signals 122 with the frame or packet; decoding/extracting, the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least sonic of the one or more access points 112, the one or more electronic devices 114 and/or the one or more optional controllers 116. As another example, in another embodiment, different electronic devices are transmitting and/or receiving frames or packets.

Figure 2:
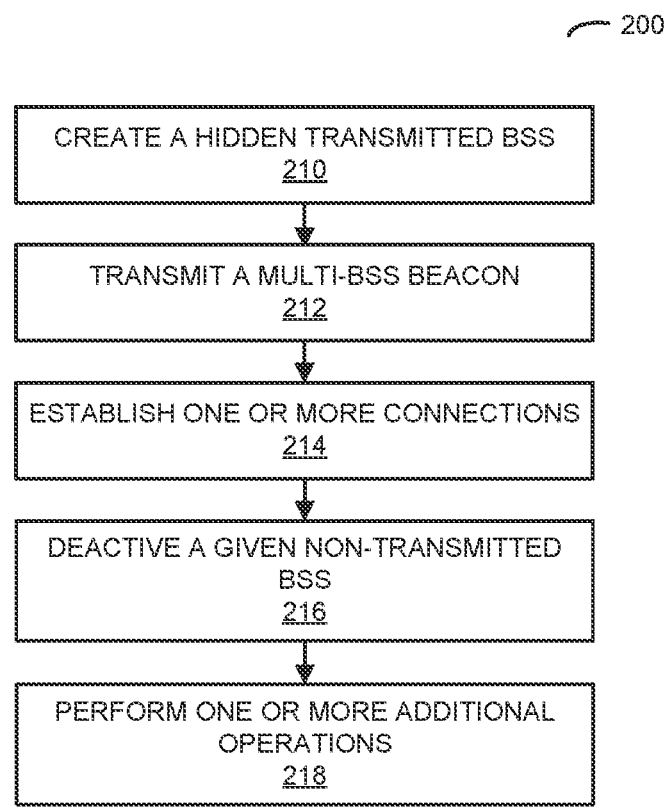
FIG. 2 is a flow diagram illustrating an example method for providing a multi-BSS beacon in the system in FIG. 1 in accordance with an embodiment of the present disclosure.

We now describe embodiments of the method. FIG. 2 presents an example of a flow diagram illustrating an example method 200 for providing a multi-BSS beacon. Moreover, method 200 may be performed by an electronic device, such as one of the one or more access points 112 in FIG. 1, e.g., access point 112-1.

During operation, an electronic device may create a hidden transmitted BSS (operation 210). For example, the hidden transmitted BSS may be hidden, e.g., from an operator of a network that includes the electronic device and/or from the one or more second electronic devices.

Moreover, the electronic device may transmit a multi-BSS beacon operation 212) with a transmitted BSSID and a wild-card SSID (or blank character string) of the hidden transmitted BSS, and, for one or more non-transmitted BSSes, one or more non-transmitted BSSIDs and associated SSIDs.

Then, the electronic device may establish one or more connections (operation 214) with the one or more second electronic devices via the one or more non-transmitted BSSes.

Furthermore, the electronic device may deactivate a given non-transmitted BSS (operation 216) in the one or more non-transmitted BSSes without impacting a remainder of the non-transmitted BSSes.

In some embodiments, the electronic device may optionally perform one or more additional operations (operation 218). For example, the electronic device may automatically create the hidden transmitted BSS. Alternatively, the electronic device may create the hidden transmitted BSS in response to user-interface activity associated with a user of the electronic device, which specifies that an SSID of the hidden transmitted BSS is the wild-card SSID. Thus, in some embodiments, the creating (operation 210) may include changing an SSID of an existing transmitted BSS into a wild-card SSID in response to receiving the user-interface activity.

Note that the electronic device may be compatible with IEEE 802.11ax.

Moreover, the hidden transmitted BSS may not occur in scan lists of the one or more second electronic devices. Furthermore, the hidden transmitted BSS may not be used by the electronic device to establish connections or to communicate with the one or more second electronic devices. Additionally, the hidden transmitted BSS may have a non-blank character string as an SSID of the hidden transmitted BSS.

In some embodiments, the electronic device may not deactivate the hidden transmitted BSS.

Moreover, IEs associated with the hidden transmitted BSS may be common to the hidden transmitted BSS and the one or more non-transmitted BSSes. For example, the IEs may include a minimum number of IEs that are common to the hidden transmitted BSS and the one or more non-transmitted BSSes.

In some embodiments of method 200, there may be additional or fewer operations. Moreover, there may be different operations. Furthermore, the order of the operations may be changed, and/or two or more operations may be combined into a single operation. For example, in some embodiments, instead of or in addition to providing the multi-BSS beacon, the electronic device may provide a probe response with the transmitted. BSSID and the wild-card SSID of the hidden transmitted BSS, and the one or more non-transmitted BSSIDs and the one or more associated SSIDs.

Figure 3:
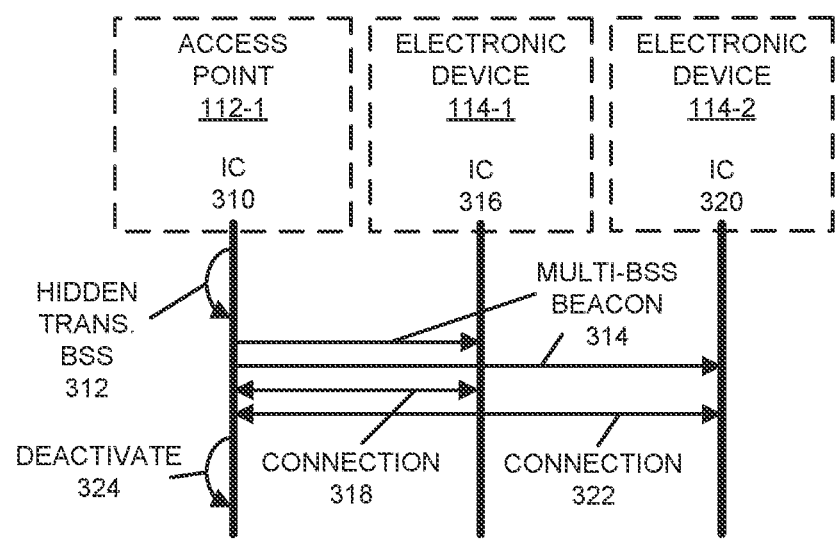
FIG. 3 is a drawing illustrating an example of communication among electronic devices in FIG. 1 in accordance with an embodiment of the present disclosure.

FIG. 3 presents a drawing illustrating an example of communication between access point 112-1 and electronic device 114-1 and electronic device 114-2. In FIG. 3, an interface circuit (IC) 310 in access point 112-1 may create a hidden transmitted BSS 312. Moreover, interface circuit 310 may transmit a multi-BSS beacon 314 with a transmitted BSSID and a wild-card SSID of the hidden transmitted BSS 312, and, for one or more non-transmitted BSSes, one or more non-transmitted BSSIDs and their associated SSIDs.

After receiving multi-BSS beacon 314, an interface circuit 316 in electronic device 114-1 may associate or establish a connection 318 with access point 112-1. For example, electronic device 114-1 may establish connection 318 via a first of the one or more non-transmitted BSSes.

Moreover, after receiving multi-BSS beacon 314, an interface circuit 320 in electronic device 114-2 may associate or establish a connection 322 with access point 112-1. For example, electronic device 114-2 may establish connection 322 via a second of the one or more non-transmitted BSSes.

Subsequently, interface circuit 310 may deactivate 324 a given non-transmitted BSS, such as the first non-transmitted BSS or the second non-transmitted BSS, without impacting a remainder of the non-transmitted BSSes.

While FIG. 3 illustrates some operations using unilateral or bilateral communication (which are, respectively, represented by one-sided and two-sided arrows), in general a given operation in FIG. 3 may involve unilateral or bilateral communication.

Figure 4:
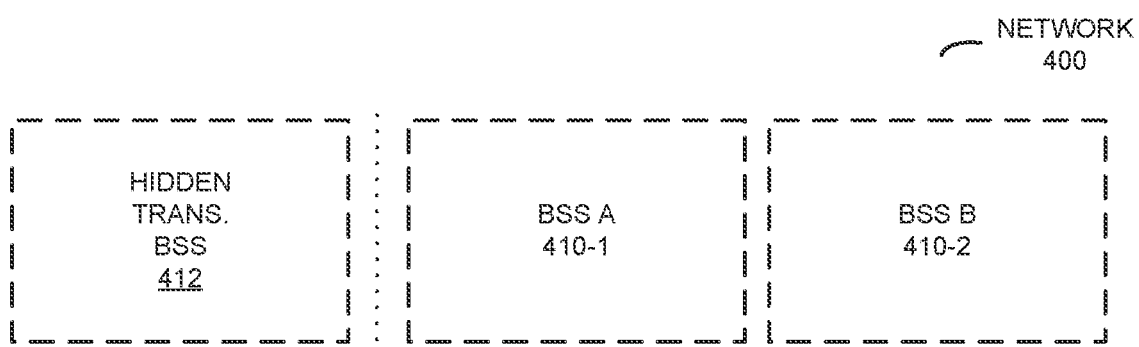
FIG. 4 is a drawing illustrating an example of a network with multiple BSSes in accordance with an embodiment of the present disclosure.

FIG. 4 presents a drawing illustrating an example of a network 400 with multiple BSSes (or WLANs) 410 and 412. In existing communication protocols, access point 112-1 may activate BSS A 410-1 and then may activate BSS B 410-2. In this case, BSS A 410-1 may be a transmitted BSS and BSS B 410-2 may be a non-transmitted BSS. However, if access point 112-1 subsequently deactivates BSS A 410-1, then access point 112-1 may also need to deactivate BSS B 410-2. In order to continue using BSS B 410-2, access point 112-1 may need to reactivate it (which would make BSS B 410-2 the transmitted BSS). Note that the deactivating and reactivating of BSS B 410-2 is time-consuming and disrupts communication with associated clients and stations.

In order to address these problems, access point 112-1 may create a hidden transmitted BSS 412 that has a wild-card. SSID. This hidden transmitted BSS 412 may remain active. Then, access point 112-1 may activate BSS A 410-1 and BSS B 410-2, which are each non-transmitted BSSes. Because BSS A 410-1 and BSS B 410-2 are non-transmitted BSSes, access point 112-1 can activate and deactivate either of BSS A 410-1 or BSS B 410-2 without impacting BSS B 410-2 or BSS B 410-1.

Furthermore, by configuring the hidden transmitted BSS 412 with a minimum number of IEs that are common to the hidden transmitted BSS 412 and BSS A 410-1 and BSS B 410-2, access point 112-1 may ensure that BSS A 410-1 and BSS B 410-2 do not inherent unwanted or unnecessary IEs (such as IEs that specify a hotspot protocol, certified optimized connectivity, or compatibility with IEEE 802.11r). This may make it easier to dynamically configure BSS A 410-1 and/or BSS B 410-2 at run time, because instead of attempting to disable unwanted or unnecessary IEs (which may or may not be supported), additional desired capabilities for a given non-transmitted BSS may be specified using one or more associated IEs.

Figure 5:
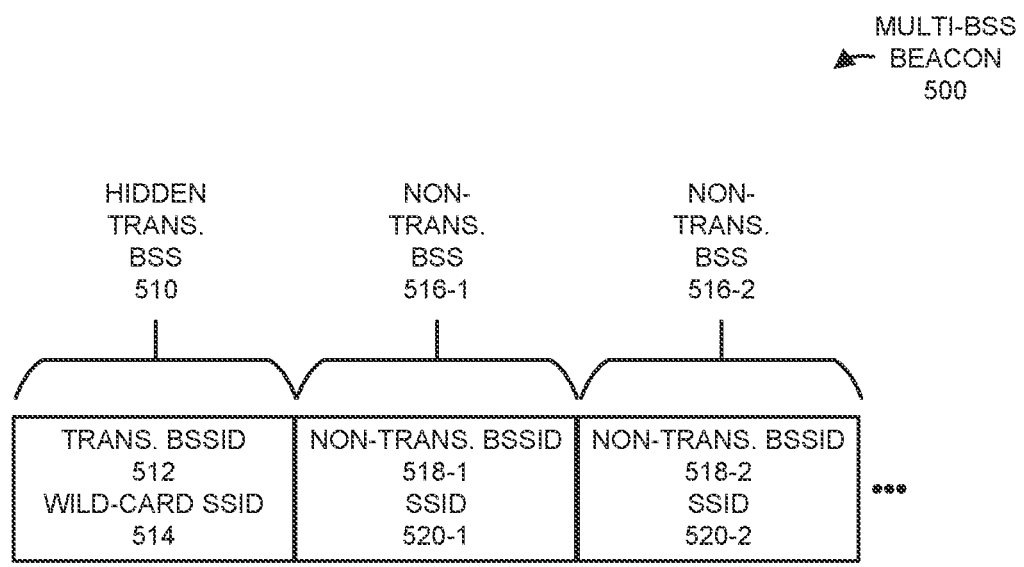
FIG. 5 is a drawing illustrating a multi-BSS beacon in accordance with an embodiment of the present disclosure.

FIG. 5 presents a drawing illustrating an example of a multi-BSS beacon 500. Notably, the multi-BSS beacon 500 may include a transmitted BSSID 512 and a wild-card SSID 514 of a hidden transmitted BSS 510, and one or more non-transmitted BSSIDs 518 and one or more associated SSIDs 520 of non-transmitted BSSes 516. For example, non-transmitted BSSID 518-1 may equal transmitted BSSID 512 plus one, non-transmitted BSSID 518-2 may equal transmitted BSSID 512 plus two, etc.

Note that the multi-BSS beacon 500 may include additional information, less information or different information from that shown in FIG. 5.

We now describe embodiments of an electronic device, which may perform at least some of the operations in the communication techniques. For example, the electronic device may include a component in system 110, such as one of: the one or more access points 112, the one or more electronic devices 114 and/or the one or more optional controllers 116. FIG. 6 presents a block diagram illustrating an electronic device 600 in accordance with some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, graphical processor units (GPUs) and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory (which collectively or individually are sometimes referred to as a 'computer-readable storage medium'). In some embodiments, instructions for processing subsystem 610 in memory subsystem 612 include: one or more program modules or sets of instructions (such as program instructions 622 or operating system 624), which may be executed by processing subsystem 610, Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as nodes 608, e.g., a pad, which can be coupled to the one or more antennas 620. Thus, electronic device 600 may or may not include the one or more antennas 620.) For example, networking subsystem 614 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 600 may be adapted or changed using pattern shapers (such as reflectors) in one or more antennas 620 (or antenna elements), which can be independently and selectively electrically coupled to ground to steer the transmit antenna radiation pattern in different directions. Thus, if one or more antennas 620 includes N antenna-radiation-pattern shapers, the one or more antennas 620 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting frames and/or scanning for frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

Although specific components are used to describe: electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 614 or electronic device 600. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for interface circuit 618) or in firmware in interface circuit 618. Alternatively or additionally, at least some of the operations in the communication techniques may be implemented in a physical layer, such as hardware in interface circuit 618.

Additionally, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 60 GHz, and/or a band of frequencies used by a Citizens Broadband Radio Service or by LTE. In some embodiments, the communication between electronic devices uses multi-user transmission (such as orthogonal frequency division multiple access or OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to wirelessly communicate with one or more second electronic devices, wherein the interface circuit is configured to:
create a hidden transmitted basic service set (BSS);
transmit a multi-BSS beacon comprising: a transmitted basic service set identifier (BSSID) and a wild-card selective service set identifier (SSID) of the hidden transmitted BSS, and, for one or more non-transmitted BSSes, one or more non-transmitted BSSIDs and associated SSIDs;
establish one or more connections with the one or more second electronic devices via the one or more non-transmitted BSSes; and
deactivate a given non-transmitted BSS in the one or more non-transmitted BSSes without impacting a remainder of the one or more non-transmitted BSSes.

2. The electronic device of claim 1, wherein the electronic device comprises an access point.

3. The electronic device of claim 1, wherein the electronic device is compatible with Institute of Electrical and Electronics Engineers (IEEE) 802.11ax.

4. The electronic device of claim 1, wherein the hidden transmitted BSS does not occur in scan lists of the one or more second electronic devices.

5. The electronic device of claim 1, wherein the electronic device is configured to not use the hidden transmitted BSS to establish connections or to communicate with the one or more second electronic devices.

6. The electronic device of claim 1, wherein the electronic device is configured to not have a non-blank character string as an SSID of the hidden transmitted BSS.

7. The electronic device of claim 1, wherein the electronic device is configured to not deactivate the hidden transmitted BSS.

8. The electronic device of claim 1, wherein the electronic device is configured to automatically create the hidden transmitted BSS.

9. The electronic device of claim 1, wherein the electronic devices is configured to receive user-interface activity that specifies that an SSID of the hidden transmitted BSS is the wild-card SSID; and
wherein the electronic device is configured to create the hidden transmitted BSS based at least in part on the received user-interface activity.

10. The electronic device of claim 1, wherein information elements (IEs) associated with the hidden transmitted BSS are common to the hidden transmitted BSS and the one or more non-transmitted BSSes.

11. A non-transitory computer-readable storage medium for use in conjunction with an electronic device, the computer-readable storage medium storing program instructions, wherein, when executed by the electronic device, the program instructions cause the electronic device to perform one or more operations comprising:
creating a hidden transmitted basic service set (BSS);
transmitting a multi-BSS beacon comprising: a transmitted basic service set identifier (BSSID) and a wild-card selective service set identifier (SSID) of the hidden transmitted BSS, and, for one or more non-transmitted BSSes, one or more non-transmitted BSSIDs and associated SSIDs;
establishing one or more connections with one or more second electronic devices via the one or more non-transmitted BSSes; and
deactivating a given non-transmitted BSS in the one or more non-transmitted BSSes without impacting a remainder of the one or more non-transmitted BSSes.

12. The non-transitory computer-readable storage medium of claim 11, wherein the electronic device does not use the hidden transmitted BSS to establish connections or to communicate with the one or more second electronic devices.

13. The non-transitory computer-readable storage medium of claim 11, wherein the electronic device does not have a non-blank character string as an SSID of the hidden transmitted BSS.

14. The non-transitory computer-readable storage medium of claim 11, wherein the electronic device does not deactivate the hidden transmitted BSS.

15. The non-transitory computer-readable storage medium of claim 11, wherein the electronic device automatically creates the hidden transmitted BSS.

16. The non-transitory computer-readable storage medium of claim 11, wherein the operations comprise receiving user-interface activity that specifies that an SSID of the hidden transmitted BSS is the wild-card SSID; and
wherein the electronic device creates the hidden transmitted BSS based at least in part on the received user-interface activity.

17. The non-transitory computer-readable storage medium of claim 11, wherein information elements (IEs) associated with the hidden transmitted BSS are common to the hidden transmitted BSS and the one or more non-transmitted BSSes.

18. A method for providing a multi-basic service set (BSS) beacon, comprising:
by an electronic device:
creating a hidden transmitted basic service set (BSS);
transmitting a multi-BSS beacon comprising: a transmitted basic service set identifier (BSSID) and a wild-card selective service set identifier (SSID) of the hidden transmitted BSS, and, for one or more non-transmitted BSSes, one or more non-transmitted BSSIDs and associated SSIDs;
establishing one or more connections with one or more second electronic devices via the one or more non-transmitted BSSes; and
deactivating a given non-transmitted BSS in the one or more non-transmitted BSSes without impacting a remainder of the one or more non-transmitted BSSes.

19. The method of claim 18, wherein the method comprises receiving user-interface activity that specifies that an SSID of the hidden transmitted BSS is the wild-card SSID; and
wherein the electronic device creates the hidden transmitted BSS based at least in part on the received user-interface activity.

20. The method of claim 18, wherein information elements (IEs) associated with the hidden transmitted BSS are common to the hidden transmitted BSS and the one or more non-transmitted BSSes.

* * * * *